(12) United States Patent
Morneweck

(10) Patent No.: US 6,782,634 B2
(45) Date of Patent: Aug. 31, 2004

(54) SENSOR AND METHOD FOR LOCATING A DISCONTINUITY

(75) Inventor: Daniel L. Morneweck, Garden City, MI (US)

(73) Assignee: United Dominion Industries, Inc., Charlotte, NC (US)

( * ) Notice: Subject to any disclaimer, the term of this patent is extended or adjusted under 35 U.S.C. 154(b) by 0 days.

(21) Appl. No.: 10/142,859

(22) Filed: May 13, 2002

(65) Prior Publication Data

US 2002/0184781 A1 Dec. 12, 2002

Related U.S. Application Data

(60) Provisional application No. 60/290,694, filed on May 14, 2001.

(51) Int. Cl.[7] ............................. G01B 3/00; G01D 21/00
(52) U.S. Cl. ............................. 33/644; 33/836; 33/542; 33/561
(58) Field of Search ................... 33/644, 520, 542–543, 33/561, 676, 832–833, 836, 1 N, 1 PT

(56) References Cited

U.S. PATENT DOCUMENTS

| | | | |
|---|---|---|---|
| 3,093,909 A | * 6/1963 | Eisele | 33/501.4 |
| 4,509,266 A | 4/1985 | Cusack | 33/174 L |
| 4,571,839 A | * 2/1986 | Burton | 33/560 |
| 4,773,164 A | * 9/1988 | Taylor et al. | 33/644 |
| 4,991,306 A | * 2/1991 | Raiha | 33/520 |
| 5,168,638 A | 12/1992 | Barton | 33/644 |
| 5,777,562 A | 7/1998 | Hoffman | 340/870.07 |
| 5,782,006 A | * 7/1998 | Erway et al. | 33/520 |

\* cited by examiner

*Primary Examiner*—Diego Gutierrez
*Assistant Examiner*—Yaritza Guadalupe
(74) *Attorney, Agent, or Firm*—Baker & Hostetler LLP

(57) ABSTRACT

A method and apparatus for locating a discontinuity such as a hole in a work piece is provided. The apparatus includes a probe having a shaft attached to a handle for locating a discontinuity in relation to a coordinate system. The probe includes an end unit attached to an end of the shaft opposite an end of the shaft to which the handle is attached. The end unit is configured to contact a surface associated with the discontinuity and move in relation to the coordinate system to align the end unit to an axis associated with the discontinuity. At least one position sensor is located entirely within the shaft and configured to sense the position of the end unit in relation to the coordinate system. The shaft includes a plurality of bores and the sensor is located within at least one of the bores.

32 Claims, 13 Drawing Sheets

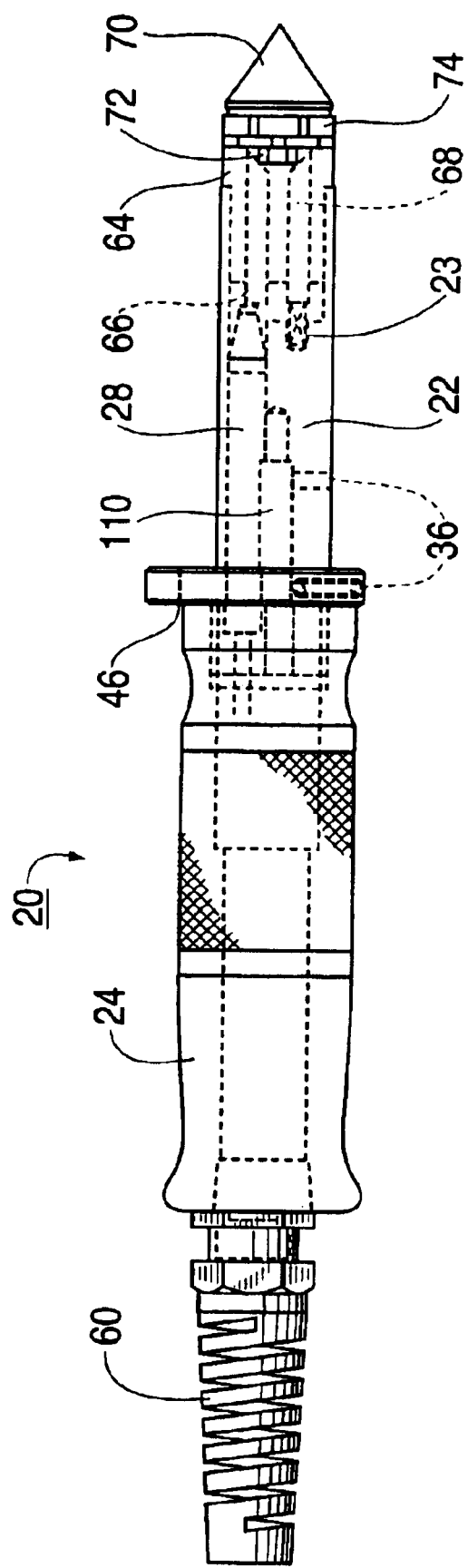

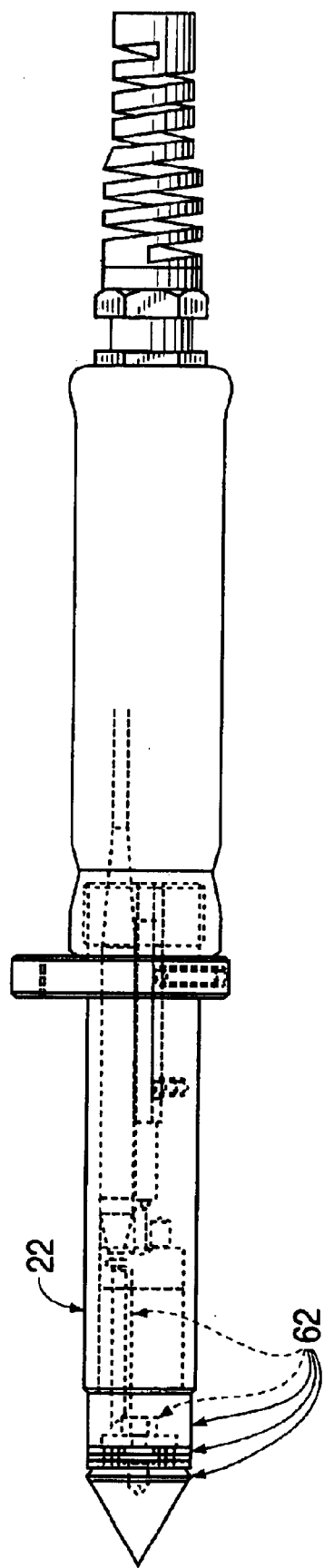
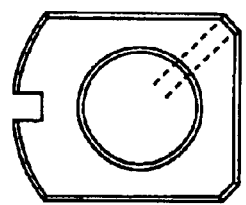
FIG. 15A
FIG. 15B

_US 6,782,634 B2_

SENSOR AND METHOD FOR LOCATING A DISCONTINUITY

PRIORITY

This application claims priority to the provisional U.S. Patent Application entitled, SENSOR FOR LOCATING A DISCONTINUITY, filed May 14, 2001, having a Ser. No. 60/290,694, the disclosure of which is hereby incorporated herein by reference.

FIELD OF THE INVENTION

The present invention relates generally to the field of discontinuity sensors, and, in particular, to the art of detecting the location of a discontinuity in a workpiece.

BACKGROUND OF THE INVENTION

Discontinuity sensors (also referred to in this document as probes) have been well known for some time. One known discontinuity sensor is disclosed in U.S. Pat. No. 5,168,638 to Barton, the disclosure of which is hereby incorporated herein by reference. A known discontinuity sensor is illustrated in FIGS. 1A and 1B. As illustrated in FIGS. 1A and 1B, typical prior art discontinuity sensors include a shaft 222, a handle 224, a pair of measuring slides 266, pair of offset slide assemblies 268, an end unit 270, a spacer 274, an activator 272, and a pair of position indicators 228. The position indicators 228 may be held in place by a clamp 210 fastened into place by screws located in radial bores 236. Generally, movement of the end unit at the distal end of the shaft causes movement of one or more of the slides, and that movement is translated to the position indicators for feedback to the user.

Unfortunately, known discontinuity sensors suffer from at least two primary drawbacks. First, if the length of the sensor is to be varied, then at least some of the parts must likewise be varied in order to accommodate the change in length of the sensor. Second, because some of the operating components of the sensor are disposed in the handle while others are disposed in the shaft, the accuracy of a sensor of this type may be compromised by slight movements of the handle relative to the shaft. These slight movements may be caused by temperature variations and the like. Thus, a discontinuity sensor is needed which is comprised predominantly of components which are capable of use in a sensor of any length, and which includes all operating components mounted on or in the shaft and separate from the handle.

SUMMARY OF THE INVENTION

It is therefore a feature and advantage of the present invention to provide a probe capable of locating the location of a feature in a workpiece such as a hole, slot, post, or other artifact. The probe may use shafts of different lengths.

It is another feature and advantage of the present invention to provide a probe that has a handle, a wire strain assembly and other features facilitating use.

The features mentioned above and other features and advantages are achieved through the use of a novel discontinuity sensor as herein disclosed. In accordance with one embodiment of the present invention, a probe having a shaft attached to a handle for locating a discontinuity in relation to a coordinate system is provided. The probe includes: a handle; a shaft attached to the handle; an end unit attached to an end of the shaft opposite an end of the shaft that the handle is attached, the end unit configured to contact a surface associated with the discontinuity and move in relation to the coordinate system to align the end unit to an axis associated with the discontinuity; and at least one position sensor located substantially within the shaft configured to sense the position of the end unit in relation to the coordinate system, wherein the shaft includes a plurality of bores and the sensor is located within at least one of the bores.

In accordance with another embodiment of the present invention, a probe for locating a feature of a workpiece in relation to a coordinate system is provided. The probe includes: a handle; a shaft attached to the handle; an end unit attached to an end of the shaft opposite an end of the shaft that the handle is attached, the end unit configured to sense a surface associated with the discontinuity to allow alignment to an axis associated with the discontinuity; and a sensing means located substantially within the shaft configured to sense the position of the end unit in relation to the coordinate system.

In accordance with another embodiment of the present invention, a method of using a probe to locate a feature in a workpiece is provided. The method includes: orienting the probe with a known coordinate system by using an alignment flange of the probe; inserting a conical end unit portion of a probe into the feature; permitting the end unit to slide radially as the end unit is inserted into the feature to cause the end unit portion of the probe to rest against a surface defining at least part of the feature; tracking the sliding movement of the end unit with sliding members; biasing the end unit to a predetermined position with biasing members; sensing the siding movement of the sliding members; and generating a signal related to an amount of distance the end unit has moved with respect to the coordinate system.

There has thus been outlined, rather broadly, some features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Further features, embodiments, and advantages of the present invention will become apparent from the following detailed description with reference to the drawings, wherein:

FIG. 13 is a side view of a sensor of FIG. 2A showing subassemblies within the sensor;

FIG. 15A is a side view of a discontinuity sensor according to one embodiment of the invention;

FIG. 15B is an end view of a discontinuity sensor according to one embodiment of the invention.

DETAILED DESCRIPTION OF THE PREFERRED EMBODIMENTS OF THE INVENTION

Figure 1B:
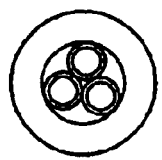
FIG. 1B is an end cross-sectional view of the prior art discontinuity sensor of FIG. 1A.
Figure 1A:
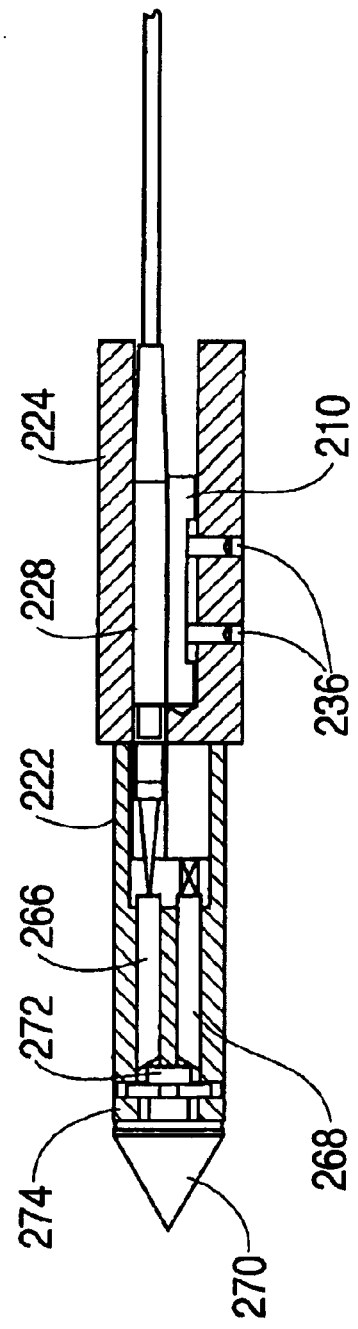
FIG. 1A is a side cross-sectional view of a prior art discontinuity sensor.
Figure 2A:
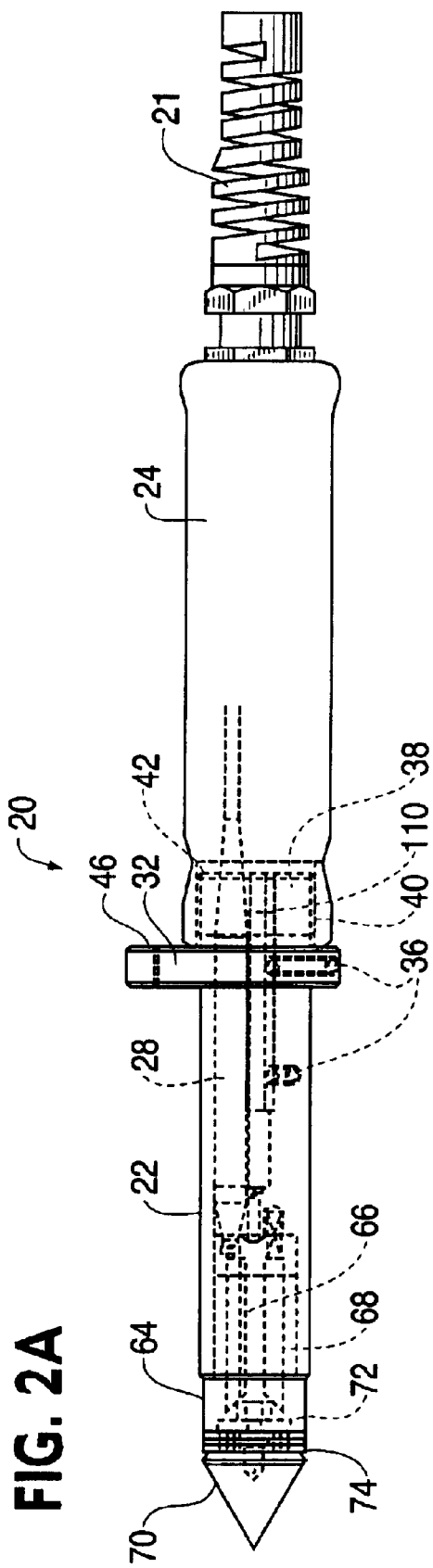
FIG. 2A is an engineering diagram side view of a discontinuity sensor in accordance with a first embodiment of the present invention.
Figure 2B:
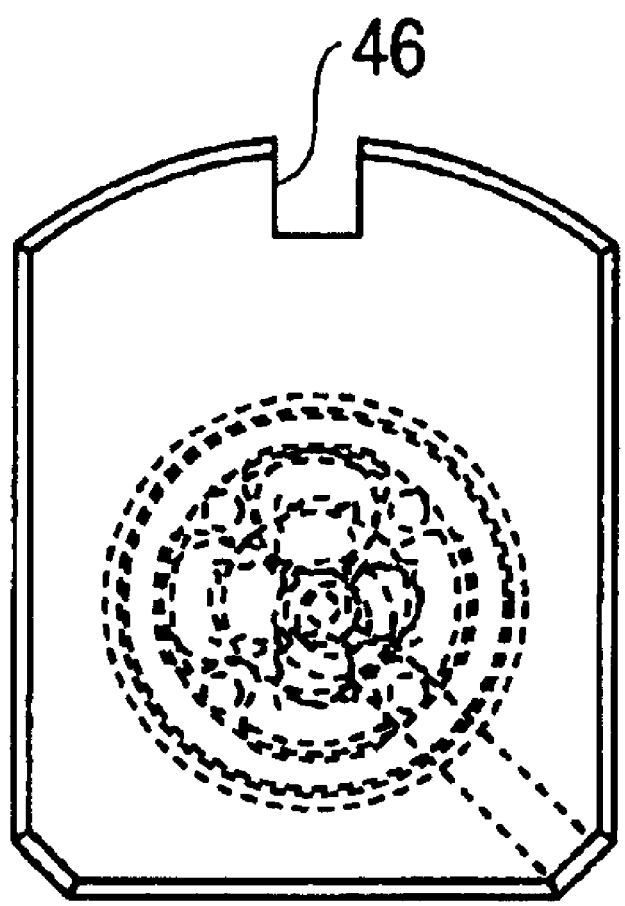
FIG. 2B is an engineering diagram end view of the discontinuity sensor of FIG. 2A.
Figure 3A:
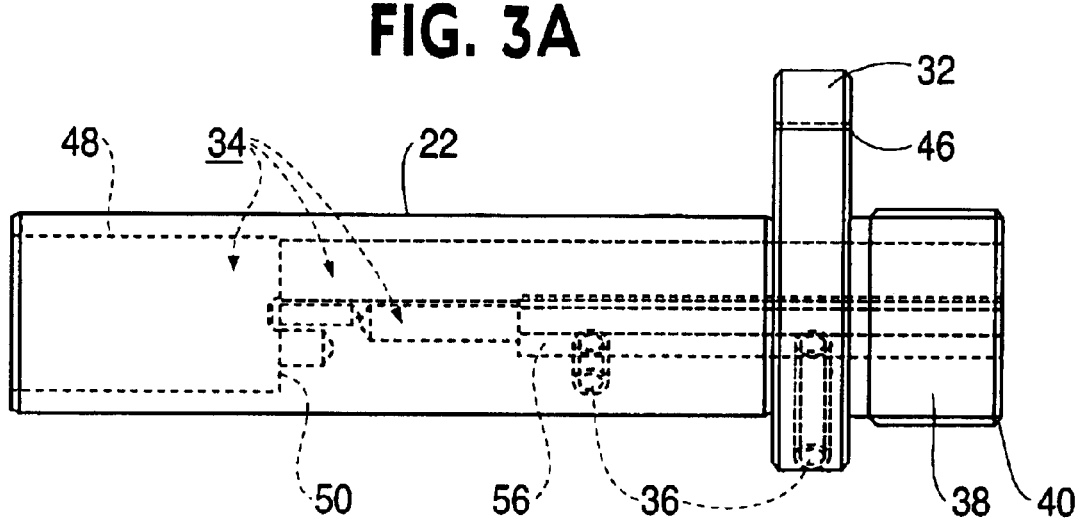
FIG. 3A is an engineering diagram side view of a shaft for use with the discontinuity sensor of FIG. 2A.
Figure 3B:
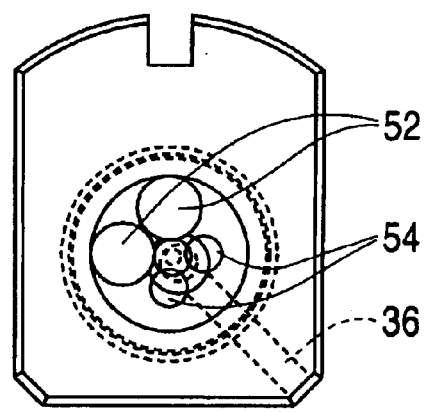
FIG. 3B is an engineering diagram end view of the shaft of FIG. 3A.

FIGS. 2A and 2B are engineering diagrams of a side view and an end view, respectively, of a discontinuity sensor (also referred to in this document as a probe) in accordance with a first embodiment of the present invention. The probe 20 includes a shaft 22, a handle 24, a wire strain assembly 21, a sensing cartridge 62, and a pair of position indicators 28. FIGS. 3A and 3B are an engineering diagram side view and an end view, respectively, of a shaft 22 for use with the discontinuity sensor of FIG. 2A. The shaft 22 is an elongated metal cylinder. In some embodiments, it may be machined from A2-type tool steel. Each end is at least partially open to permit the internal components of the sensor to be inserted therein. The shaft 22 as shown in FIG. 3A includes a head 38, a circumferential alignment flange 32, a plurality of internal longitudinal bores 34 of various lengths, and a pair of radial bores 36 extending perpendicularly to the longitudinal bores 34.

The integral head 38 is disposed at the proximal end of the shaft 22 and includes a male threaded fitting 40 for connection to a correspondingly-threaded female fitting 42 in the handle 24 as shown in FIG. 2A. The integral alignment flange 32 may be disposed adjacent the head 38 and includes a radial orientation slot 46 for facilitating the radial presentation of the probe 20 to an artifact in a known Cartesian coordinate system. Notably, because the alignment flange 32 is integral with the shaft 22, imprecision which might otherwise be introduced through any connection between the flange 32 and the shaft 22 is reduced. Further, because the flange 32 is disposed at the extreme proximal end of the shaft 22, the flange 32 need not be positioned in a different location in order to accommodate shafts 22 of varying lengths.

The longitudinal shaft bores 34 include a wide axial bore 48 extending longitudinally inward from the distal end of the shaft 22 and ending at an internal planar surface 50. As shown in FIGS. 3A and 3B, the longitudinal shaft bores 34 also include a first pair of cylindrical bores 52 extending longitudinally from the internal planar surface to the proximal end, each of which is adapted to receive a position indicator 28 of a suitable type. The shaft bores 34 further include a second pair of cylindrical bores 54 extending further into the interior of the shaft 22 from the internal planar surface 50. The shaft bores 34 also include an additional cylindrical bore 56 extending longitudinally inward from the proximal end parallel to and laterally intersecting the first pair of bores 52, the additional bore being adapted to receive a clamp member 110 for retaining position indicators 28 within the shaft. Still further, the shaft bores 34 include a pair of radial bores 36 or apertures, perpendicularly intersecting the clamp bore 56, for receiving clamp screws as described hereinbelow. As illustrated in FIG. 3A, one of the radial bores 36 extends through the alignment flange 32, but it should be obvious to one of ordinary skill in the art that both radial bores 36 may instead be disposed in the side of the shaft 22 itself and not in the alignment flange 32. The first and second pairs of cylindrical bores 52 and 54, the clamp bore 56 and the radial bores 36 are all disposed in known relationship with the radial orientation slot 46, such that the radial orientation slot 46 is radially aligned with one of the cylindrical bores 34 of either the first 52 or second pairs 54 of cylindrical bores.

Figure 4A:
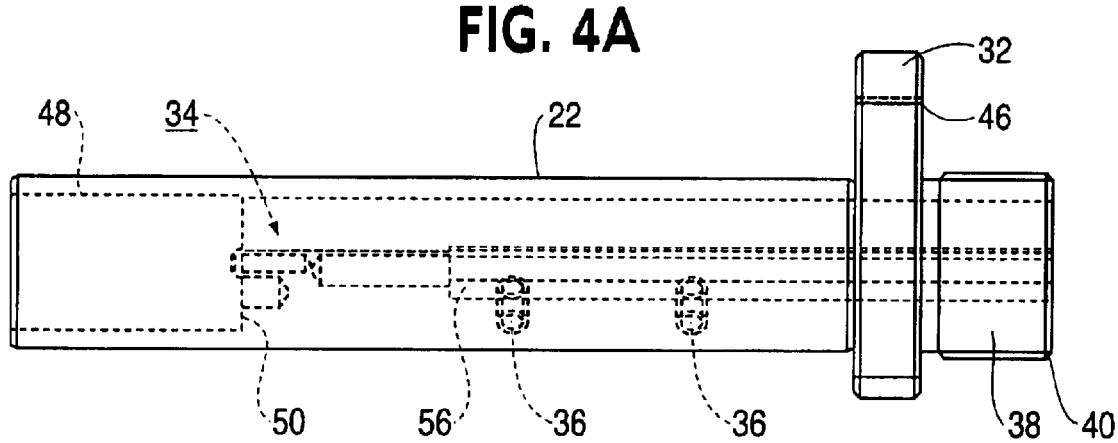
FIG. 4A is an engineering diagram side view of a first alternative shaft in accordance with a first variation of the discontinuity sensor of FIG. 2A.
Figure 4B:
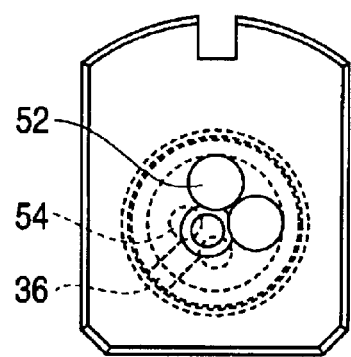
FIG. 4B is an engineering diagram end view of the shaft of FIG. 4A.
Figure 5:
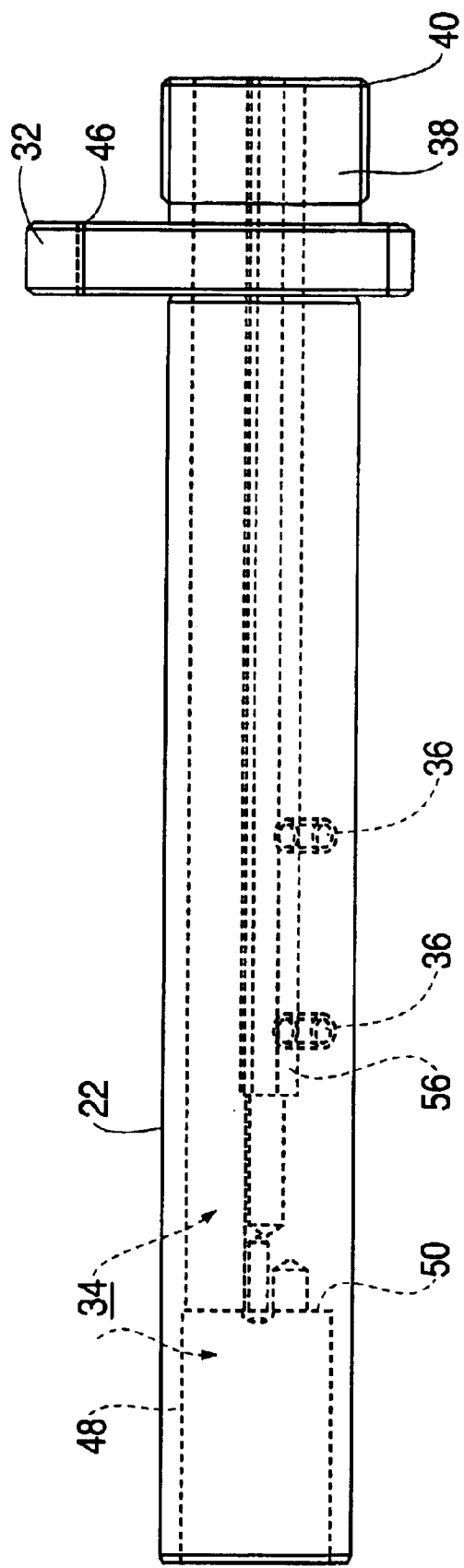
FIG. 5 is an engineering diagram side view of a second alternative shaft in accordance with a second variation of the discontinuity sensor of FIG. 2A.
Figures 14A, 14B, 14C:
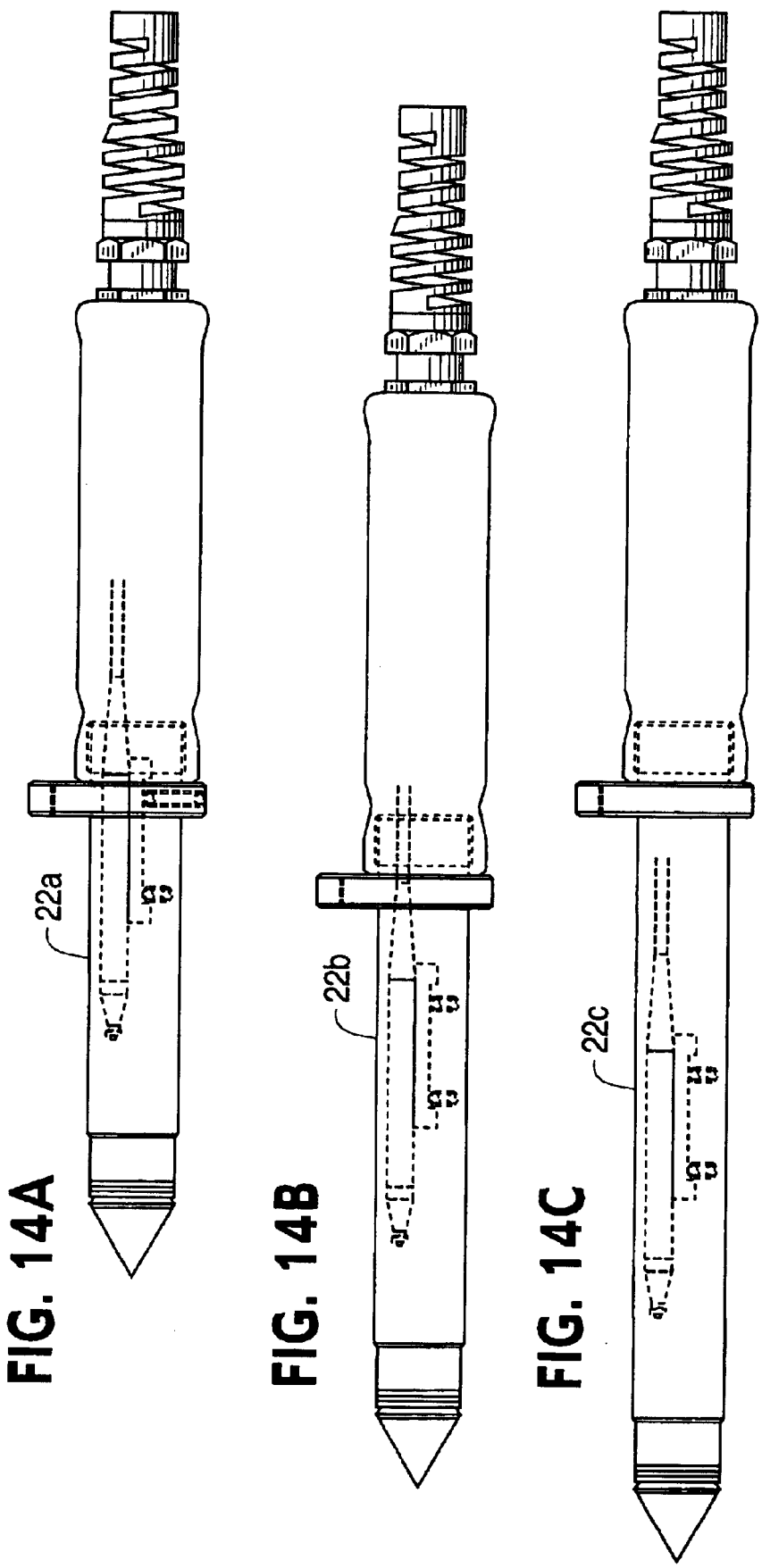
FIG. 14A is a side view of an optional embodiment of a discontinuity sensor.
FIG. 14B is a side view of another optional embodiment of a discontinuity sensor.
FIG. 14C is a side view of another optional embodiment of a discontinuity sensor.

Significantly, the shaft 22 itself may be produced in various lengths as desired by the user. FIGS. 14A, 14B and 14C are examples of probes 20 with different length shafts 22. FIG. 4A is an engineering diagram side view of a first alternative shaft 22 in accordance with a first variation of the discontinuity sensor 20 of FIG. 2A, and FIG. 5 is an engineering diagram side view of a second alternative shaft 22 in accordance with a second variation of the discontinuity sensor of FIG. 2A. FIG. 4B is an engineering diagram end view of the shaft 22 of FIG. 4A. As illustrated therein, the variation in length may be accommodated by lengthening the body of the shaft 22 just beyond the alignment flange 32. If the shaft 22 is so lengthened, the cylindrical bores 34 extending from the proximal end of the shaft 22 may be correspondingly lengthened and the radial bore 36, otherwise disposed in the alignment flange 32, may instead be disposed directly in the side of the shaft 22 as previously discussed, but otherwise the shaft's construction, including the disposition of all the bores, remains similar relative to the distal end of the shaft 22. This permits a uniformly-sized handle 34, a uniformly-sized sensing cartridge 26 and uniform position indicators 28 to be utilized regardless of the length of the shaft 22, as will become apparent below and is an aspect of the present invention.

The handle 24 is a generally cylindrical hollow tube which may be contoured to fit in a user's hand. The handle 24 may be made from a machined metal such as aluminum, or it maybe made of plastic, rubber, or other suitable material. Both ends of the handle 24 are open so that the position indicators 28 and their connection cables (not shown) may be passed therethrough. A female threaded fitting 42 corresponding to the male threaded fitting 40 on the shaft 22 is disposed at the distal end, and a wire strain assembly 60 may be disposed at the proximal end to provide protection for the position indicator connection cables (not shown) passing therethrough.

Figure 6A:
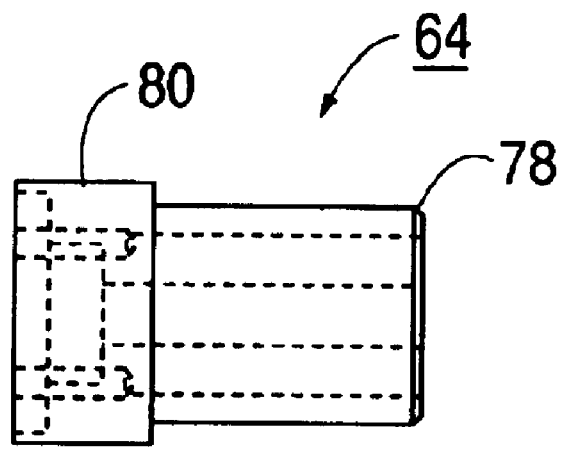
FIG. 6A is an engineering diagram side view of an insert for use with the discontinuity sensor of FIG. 2A.
Figure 6B:
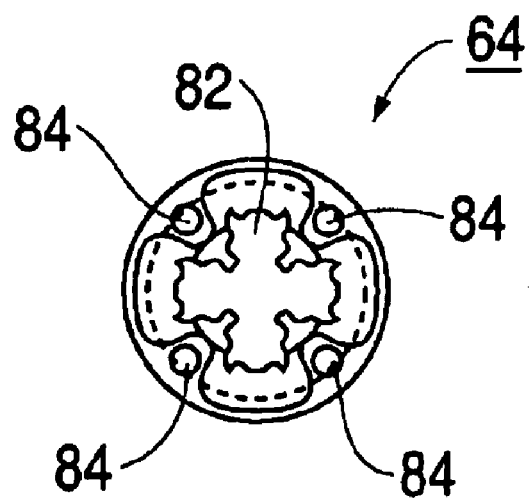
FIG. 6B is an engineering diagram end view of the insert of FIG. 6A.

The sensing cartridge 62 includes a cylindrical insert 64, a pair of measuring slides 66; a pair of offset slide assemblies 68, an end unit 70, an activator 72, a spacer 74 and a plurality of fasteners (not shown). FIGS. 6A and 6B are engineering diagrams of a side view and an end view, respectively, of an insert 64 for use with the discontinuity sensor 20 of FIG. 2A. The insert 64, which may be machined from A2-type tool steel, includes a stem 78 and a head 80. The stem 78 is disposed within the distal end of the shaft 22 such that the head 80 of the insert 64 fits snugly against the outer surfaces end of the shaft 22. The insert 64 includes one or more slide bores 82 of a suitable shape for a purpose described hereinbelow which extend from one end of the insert 64 to the other, and a plurality of threaded fastener receptacles 84 formed around the periphery of the head 80. In the exemplary embodiment shown, there is only a single slide bore 82 and four fastener receptacles 84, but it should be clear to one of ordinary skill that other numbers, shapes, and sizes other than the ones illustrated, may instead be utilized without departing from the scope of the present invention. If only a single bore 82 is utilized, then it should generally be of a suitable size and shape to accommodate a plurality of slides 66, 68 as described hereinbelow. Likewise, if a plurality of bores are utilized, they should each generally be of a suitable size and shape to accommodate one or more of the slides 66, 68.

Figure 9A:
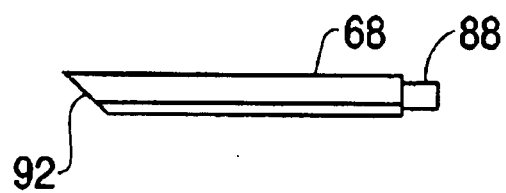
FIG. 9A is an engineering diagram side view of an offset slide for use with the discontinuity sensor of FIG. 2A.
Figure 9B:
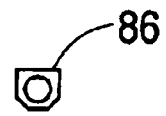
FIG. 9B is an engineering diagram end view of the offset slide of FIG. 9A.

FIGS. 9A and 9B are engineering diagrams of a side view and an end view, respectively, of an offset slide 68 for use with the discontinuity sensor 20 of FIG. 2A. Each offset slide 68 assembly includes an offset slide 68 and a coil spring 23. Each offset slide 68 includes a peg-like extension 88 at its proximal end, and a spring 23 is fitted over the extension.

Figure 8A:
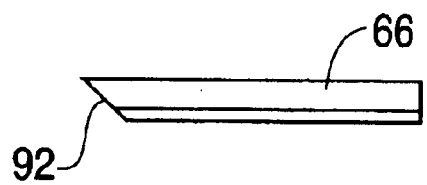
FIG. 8A is an engineering diagram side view of a measuring slide for use with the discontinuity sensor of FIG. 2A.
Figure 8B:
FIG. 8B is an engineering diagram end view of the measuring slide of FIG. 8A.

FIGS. 8A and 8B are engineering diagrams of a side view and an end view, respectively, of a measuring slide 66 for use with the discontinuity sensor 20 of FIG. 2A. The distal ends of each offset slide 68 and each measuring slide 66 are beveled at a known angle, which in the exemplary embodiment is 45 degrees. The measuring slides 66 and offset slides 68 are disposed within the slide bore 82 of the insert 64 such that the beveled slide ends 92 are disposed generally in the interior of the head 80 of the insert 64 with the slides 68, 66 extending into the body of the shaft 22. The four slides 68, 66 (2 measuring slides 66 and 2 offset slides 68) are oriented at right angles to each other with the beveled faces 92 oriented toward the axis of the insert 64. Further, each measuring slide 66 is disposed in a location diametrically opposite an offset slide 68 for a purpose that will become apparent herein below.

Figure 10A:
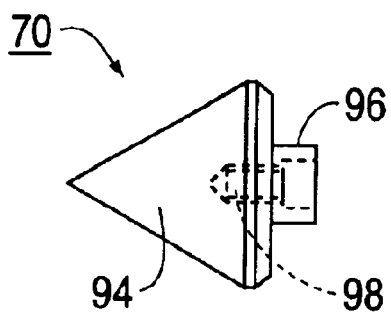
FIG. 10A is an engineering diagram side view of an end unit for use with the discontinuity sensor of FIG. 2A.
Figure 10B:
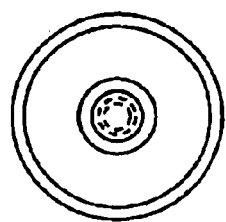
FIG. 10B is an engineering diagram end view of the end unit of FIG. 10A.

FIGS. 10A and 10B are engineering diagrams of a side view and an end view, respectively, of an end unit 70 for use with the discontinuity sensor 20 of FIG. 2A. The end unit 70 includes a generally solid conical body 94 and a narrow cylindrical boss 96 extending from the bottom of the body 94. A cylindrical counterbore 98 extends through the boss 96, with a narrower threaded counterbore 98 extending further into the body.

Figure 12A:
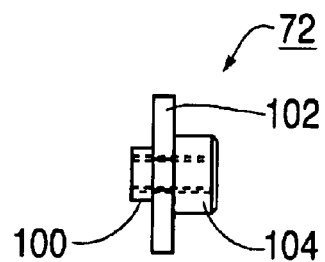
FIG. 12A is an engineering diagram side view of an activator for use with the discontinuity sensor of FIG. 2A.
Figure 12B:
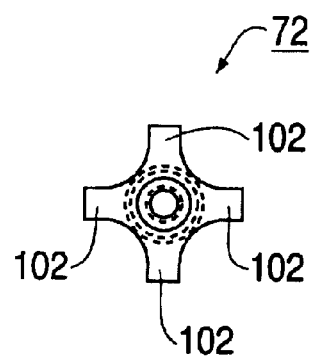
FIG. 12B is an engineering diagram distal end view of the activator of FIG. 12A.
Figure 12C:
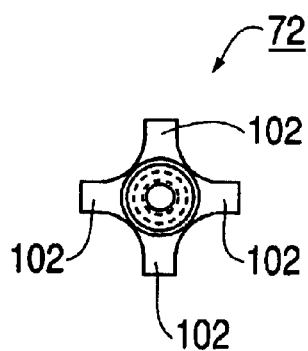
FIG. 12C is an engineering diagram proximal end view of the activator of FIG. 12A.

FIGS. 12A, 12B, and 12C are engineering diagrams of a side view, a distal end view, and a proximal end view of an activator 72 for use with the discontinuity sensor 20 of FIG. 2A. The activator 72 includes a short cylindrical stem 100, one or more radial retention members 102 and a contact member 104 having a circumferential beveled shoulder. A threaded axial bore, having a diameter corresponding to the diameter of the threaded counterbore 98 in the end unit 70, may extend entirely through the activator 72 from the contact member 104 to the stem 100. The activator stem 100 is dimensioned to be retained within the counterbore 98 of the boss 96 on the end unit 70. With the activator stem 100 thus disposed, the activator 72 may be fastened to the end unit 70 by inserting a threaded rod (not shown) through the respective bores in the activator 72 and the end unit 70.

Figure 7:
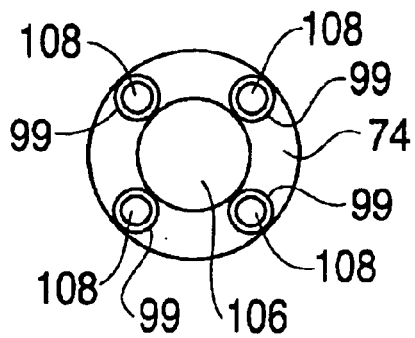
FIG. 7 is an engineering diagram end view of a spacer for use with the discontinuity sensor of FIG. 2A.

FIG. 7 is an engineering diagram end view of a spacer 74 for use with the discontinuity sensor 20 of FIG. 2A. The spacer 74 is a ring-like member having a wide axial central opening 106 corresponding in size to the outside dimension of the boss 96 on the end unit 70. The central opening 106 is dimensioned to allow limited lateral movement of the end unit boss 96 within the opening when the end unit 70 is inserted therein. The spacer 74 includes a plurality of fastener apertures 108 disposed to align with the fastener receptacles 84 located around the periphery of the insert 64 so that the spacer 74 may be fastened to the head 80 of the insert 77 using appropriate fasteners. Each fastener aperture 108 in the spacer 74 preferably includes a counterbore 99 so that the heads of the respective fasteners may be disposed below the distal surface of the spacer 74.

Several of the components of the probe 20 are collectively referred to as a cartridge 62. The cartridge 62 is a subassembly of several components. FIG. 15A shows the cartridge 62 installed in a probe 20. When the cartridge 62 is fully assembled, the activator/end unit assembly is imprisoned at the distal end of the insert 77 by the spacer 74 fitted around the end unit boss 96 between the bottom of the end unit 70 and the retention members of the activator 72. When the activator/end unit assembly is so disposed within the spacer 74, the contact member 104 of the activator 72 is in abutment with the beveled ends 92 of the various slides 66, 68. More specifically, when the activator/end unit assembly is centered within the spacer 74, the beveled shoulder of the activator 72 contact member abuts a substantially central portion of each slide's 68, 66 beveled surface 92. If the activator/end unit assembly is moved laterally relative to the spacer 74, and thus to the insert 64 and the shaft 22 of the probe 20, then one or more slides 68, 66 may be longitudinally displaced by the wedge-like action of the beveled shoulder of the contact member 104 against the slides 68, 66. One or more slides 68, 66 opposite the thus-displaced slides 68, 66 may also be longitudinally displaced in the opposite direction through use of springs 23, as will be further described herein below.

The position indicators 28 may be a variety of different sensors. For example, they may be differential transducers, the design and operation of which are well know to those of ordinary skill in the art. Either analogue or digital types may be used. Differential transducers suitable for use with the present invention include, but are not limited to, the #AX series of analogue displacement transducers and the #DP series of digital displacement transducers, both manufactured by Solartron Metrology of West Sussex, UK and distributed in the United States by Air Gage Co. of Livonia, Mich. The position indicators 28 may be held in place within the shaft 22 by a clamp assembly 109 which includes a clamp member 110 and a pair of clamp screws (not shown).

Figure 11A:
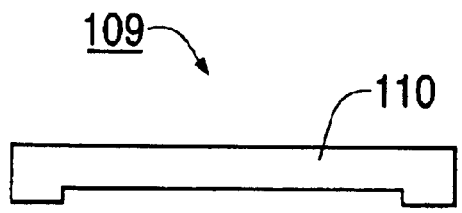
FIG. 11A is an engineering diagram side view of a clamp member for use with the discontinuity sensor of FIG. 2A.
Figure 11B:
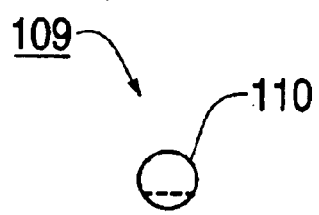
FIG. 11B is an engineering diagram end view of the clamp member of FIG. 11A.

FIGS. 11A and 11B are engineering diagrams of a side view and an end view, respectively, of a clamp member 110 for use with the discontinuity sensor 20 of FIG. 2A. The clamp member 110 may be formed from steel, aluminum, or other suitable material and is sized to fit comfortably within the clamp bore 56. Because the clamp bore 56 laterally intersects the two position indicator bores 52, the clamp member 110 tangentially abuts the lateral surfaces of the position indicators 28, and may be biased against the position indicators 28 through use of the clamp screws (not shown) inserted through the radial clamp screw bores 36 and tightened against the opposite of a probe 20 of the clamp member 110.

FIG. 13 shows one embodiment of a probe 20 in accordance with the invention and different parts of the probe 20 are also shown.

The sensor 20 may be produced as follows. The components of the sensing cartridge 62 may be mass-produced in a uniform size. A shaft length is chosen and a shaft 22 having the previously-described characteristics is produced accordingly, either in mass quantities or one at a time. Regardless of the shaft length chosen, a standard-size insert 64 may first be inserted in the distal end of the chosen shaft 22 and either pressed, glued or otherwise attached in place. A standard-size handle 24 is threaded onto the proximal end of the shaft 22, and two position indicators 28 are inserted through the wire strain assembly 60, the handle 24 and into the proximal ends of the position indicator shafts 52 in the shaft 22. The clamp member 110 may be inserted alongside the position indicators 28 in the clamp bore 56 and loosely clamped against the position indicators 28 preventing them from falling out of the shaft 22 while additional assembly takes place.

Once the positional indicators 28 are in place, the measuring slides 66 and the offset slides 68, the latter having springs 23 fitted thereon, may be inserted into the distal end of the insert 64 and into their respective bores in the body of the shaft 22. The activator 72 may then be fitted into the insert 64 between the beveled ends 92 of the slides 68, 66 and the spacer 74 fitted over the activator stem 78 and fastened to the end of the insert 64, thus imprisoning the activator 72 against the end of the insert 64. One end of the threaded rod (not shown) may then be fitted in the activator 72, and the end unit 70 screwed onto the other end, thus fastening the end unit 70 to the activator 72. Once thus assembled, the probe 20 may then be calibrated and the position of the positional indicators 28 adjusted accordingly, with the final calibrated position of the positional indicators 28 maintained by tightly clamping the positional indicators 28 in place using the clamp assembly 109.

The operation of the sensor 20 should be well known to one of ordinary skill in the art. In general, the sensor 20 may be mounted in fixed relationship with a known reference system using the radial orientation slot 46 in the circumferential alignment flange 32. When a workpiece is placed in a known relationship with the reference system, the end unit 70 is aligned with a discontinuity, such as a hole, slots, whether male or female, or other artifact in the workpiece when the discontinuity has been properly drilled, stamped, cast, forged, cut, or otherwise incorporated into the workpiece. On the other hand, if the discontinuity has been improperly placed in the workpiece, then placement of the end unit 70 on the discontinuity will cause lateral displacement of the activator/end unit assembly relative to the spacer 74 and the rest of the sensing cartridge 26.

When the contact member 104 of the activator 72 is laterally displaced toward one of the measuring slides 66, the measuring slide 66 is forced deeper into the interior of the shaft 22 by the wedge-like action of the contact member 104 against the beveled surface 92 of the measuring slide 66. The proximal end of the measuring slide 66 thus depresses the active end of the position indicator 28. Meanwhile, the offset slide 68 directly across from the measuring slide 66 is biased outward by its spring 23, thus holding the contact member 104 and the measuring slide steady 66. The amount of longitudinal movement of the active end of the position indicator 28 thus corresponds to the amount of lateral movement of the contact member 104, which corresponds to the amount of lateral movement of the activator/end unit assembly, and thus indicates the amount of error of the actual discontinuity relative to the intended location.

Similarly, when the contact member 104 of the activator 72 is laterally displaced away from one of the measuring slides 66, the measuring slide 66 may be longitudinally displaced toward the distal end of the shaft 22. The proximal end of the measuring slide 66 thus moves away from the position indicator 28, allowing the active end of the position indicator 28 to expand toward the distal shaft end as well. Meanwhile, the offset slide 68 directly across from the measuring slide 66 is forced deeper into the interior of the shaft 22 by the wedge-like action of the contact member 104 against the beveled surface 92 of the offset slide 68, thus holding the contact member 104 and the measuring slide 66 steady. The amount of longitudinal movement of the active end of the position indicator 28 thus corresponds to the amount of lateral movement of the contact member 104, which corresponds to the amount of lateral movement of the activator/end unit assembly, and thus indicates the amount of error of the actual hole relative to the intended location.

By disposing the first and second pairs of cylindrical bores 52, 54 within the shaft 22, and thus the position indicators 28 and the measuring 66 and offset slides 68, at 0 degrees, 90 degrees, 180 degrees and 270 degrees relative to the radial orientation slot 46, the position indicators 28 may thus be used to determine the actual location of the discontinuity relative to the desired location of the discontinuity in a Cartesian coordinate system. One position indicator 28 effectively indicates the displacement of the actual discontinuity from the desired position of the discontinuity along the a first axis, and the other position indicator effectively indicates the displacement of the actual discontinuity from the desired position of the discontinuity along a second axis. Together, this information may be used to correct the location of the discontinuity or of the discontinuity drilling or cutting device so that future workpieces may be produced correctly. It is very important to determine the location of each discontinuity very precisely so that the discontinuities may be positioned correctly through manufacturing or other techniques.

The disposition and retention of all components within the shaft 22 rather than the handle 24 provides significantly increased reliability. Because the shaft 22 is a single unit, and because the various components are all maintained in place relative to only the shaft 22, rather than some of the components being disposed in the shaft 22 and others in the handle 24, the probe 20 is much less sensitive to thermal expansion, irregular linear movement relative to the shaft 22 and other phenomena which otherwise affect components disposed in the handle 24 rather than the shaft 22.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A probe for locating a discontinuity in relation to a coordinate system comprising:
    a handle;
    a shaft attached to the handle;
    an alignment flange attached to at least one of the shaft and handle and configured to assist in orienting the probe to a coordinate system;
    an end unit attached to an end of the shaft opposite an end of the shaft that the handle is attached, the end unit configured to sense a surface associated with the discontinuity to allow alignment to an axis associated with the discontinuity;
    at least one position sensor located substantially within the shaft, configured to sense the position of the end unit in relation to the coordinate system,
    wherein the shaft includes a plurality of bores and the sensor is located within at least one of the bores; and
    a radial orientation apparatus including a slot configured to orient the probe within a coordinate system.

2. The probe of claim 1, further comprising:
    at least one measuring slide contained within the shaft, the measuring slide configured to slide in response to end unit movement; and
    at least one offset slide contained within the shaft, the at least one offset slide configured to urge the end unit to a first position,
    wherein the at least one measuring slide is configured to slide in response to movement by the end unit and the sensor is configured to sense a position of the at least one measuring slide with respect to the coordinate system.

3. The probe of claim 2, further comprising:
    two measuring slides contained within the shaft, the measuring slides configured to slide in response to end unit movement;
    two offset slides contained within the shaft, the offset slides configured to urge the end unit to a first position; and
    a first position sensor located substantially within the shaft configured to sense a position of one measuring slide with respect to a first axis and a second position sensor located substantially within the shaft configured to sense the other measuring slide with respect to a second axis.

4. The probe of claim 1, wherein the probe includes a cartridge comprising:
    an insert configured to attach to the shaft and receive the end unit;
    at least one measuring slide contained at least partially within the insert;
    at least one offset slide contained at least partially within the insert, the at least one offset slide is configured to urge against the insert;
    the end unit;
    an activator configured to communicate end unit movement with the at least one measuring slide;
    a spacer located between the end unit and the activator configured to permit lateral movement of the end unit and communication of end unit position to the activator;
    wherein the at least one measuring slide is configured to slide in response to movement by the activator and the sensor is configured to monitor a position of the at least one measuring slide with respect to the coordinate system.

5. The probe of claim 4, wherein the cartridge includes two movement slides and two offset slides.

6. The probe of claim 5, further comprising a first position sensor located within the shaft configured to sense a position of one measuring slide with respect to a first axis and a second position sensor located within the shaft configured to sense the other measuring slide with respect to a second axis.

7. The probe of claim 4, wherein the at least one offset slide is biased by a spring to urge against the activator.

8. The probe of claim 4, wherein the at least one measuring slide and the at least one offset slide communicate with the activator via a sloped surface.

9. The probe of claim 4, wherein the insert is fixed to the shaft to become integral with the shaft.

10. The probe of claim 4, wherein the cartridge is completely external to the handle.

11. The probe of claim 4, wherein the cartridge is configured to be used with shafts of different lengths.

12. The probe of claim 1, wherein the shaft and the handle attach to each other via threads.

13. The probe of claim 1, wherein the slot is in the flange and configured to orient the probe within a coordinate system.

14. A probe for locating a discontinuity in relation to a coordinate system comprising:
- a handle;
- a shaft attached to the handle;
- an end unit attached to an end of the shaft opposite an end of the shaft that the handle is attached, the end unit configured to sense a surface associated with the discontinuity to allow alignment to an axis associated with the discontinuity; and
- at least one position sensor located substantially within the shaft, configured to sense the position of the end unit in relation to the coordinate system,
- wherein the shaft includes a plurality of bores and the sensor is located within at least one of the bores, and the probe further comprising a wire strain assembly attached to the handle opposite the side of the handle the shaft is attached, the wire strain assembly configured have wires running axially through the wire strain assembly.

15. A probe for locating a feature of a workpiece in relation to a coordinate system comprising:
- a handle;
- a shaft attached to the handle;
- an alignment flange attached to at least one of the shaft and handle and configured to assist in orienting the probe to a coordinate system;
- an end unit attached to an end of the shaft opposite an end of the shaft that the handle is attached, the end unit configured to contact a surface associated with the discontinuity and move in relation to the coordinate system to align the end unit to an axis associated with the discontinuity;
- sensing means located substantially within the shaft for sensing the position of the end unit in relation to the coordinate system; and
- a radial orientation apparatus including a slot in the flange configured to orient the probe with a coordinate system.

16. The probe of claim 15, further comprising:
- at least one measuring slide contained within the shaft and configured to slide in response to end unit movement; and
- at least one biasing means contained within the shaft for biasing the end unit to a first end unit position,
- wherein the at least one measuring slide is configured to slide in response to movement by the end unit and the sensing means is for sensing a position of the at least one measuring slide with respect to the coordinate system.

17. The probe of claim 16, further comprising:
- two measuring slides contained within the shaft, configured to slide in response to end unit movement;
- biasing means contained within the shaft, for biasing the end unit to the first end unit position; and
- a first sensing means located within the shaft for sensing a position of one measuring slide with respect to a first axis and a second sensing means located within the shaft for sensing a position of the other measuring slide with respect to a second axis.

18. The probe of claim 15, wherein the probe includes a cartridge comprising:
- an insert configured to attach to the shaft and receive the end unit;
- at least one measuring slide contained at least partially within the insert;
- at least one biasing means contained at least partially within the insert;
- at least one offset means configured to bias the insert in a first direction;
- an activator configured to communicate end unit movement with the at least one measuring slide; and
- a spacer located between the end unit and the activator configured to permit lateral movement of the end unit and communication of end unit position to the activator,
- wherein the end unit is part of the cartridge, and
- wherein the at least one measuring slide is configured to slide in response to movement by the activator and the sensing means is for sensing a measuring signal generated by the at least one measuring slide.

19. The probe of claim 18, wherein the cartridge includes two movement slides and biasing means for biasing the end unit to a first end unit position.

20. The probe of claim 18, wherein the at least one biasing means biases the activator to a first activator position.

21. The probe of claim 18, wherein the at least one measuring slide and the at least one biasing means communicates with the activator via a sloped surface.

22. The probe of claim 18, wherein the insert is fixed to the shaft to become integral with the shaft.

23. The probe of claim 18, wherein the cartridge is completely external with the handle.

24. The probe of claim 18, wherein the cartridge is configured to be used with shafts of different lengths.

25. The probe of claim 15, further comprising a first sensing means located within the shaft for sensing a position of one measuring slide with respect to a first axis and a second sensing means located within the shaft for sensing a position of the other measuring slide with respect to a second axis.

26. The probe of claim 15, wherein the shaft and the handle attach to each other via threads.

27. A probe for locating a feature of a workpiece in relation to a coordinate system comprising:
- a handle;
- a shaft attached to the handle;
- an end unit attached to an end of the shaft opposite an end of the shaft that the handle is attached, the end unit configured to contact a surface associated with the discontinuity and move in relation to the coordinate system to align the end unit to an axis associated with the discontinuity; and
- sensing means located substantially within the shaft for sensing the position of the end unit in relation to the coordinate system, the probe further comprising a wire strain assembly attached to the handle opposite the side of the handle the shaft is attached, the wire strain assembly configured have wires running axially through the wire strain assembly.

28. A method of using a probe to locate a feature in a workpiece comprising:
- orienting the probe with a known coordinate system by using an alignment flange of the probe;
- inserting a conical end unit portion of a probe into the feature;
- permitting the end unit to slide as the end unit is inserted into the feature to cause the end unit portion of the probe to rest against a surface defining at least part of the feature;
- tracking the sliding movement of the end unit with sliding members;

biasing the end unit to a predetermined position with biasing members;

sensing the siding movement of the sliding members; and generating a signal related to an amount of distance the end unit has moved with respect to the coordinate system, and wherein orienting the probe with a known coordinate system by using an alignment flange of the probe further includes using a radial orientation apparatus including a slot located in the alignment flange.

29. The method of claim 28, wherein the apparatus used for sensing is located exclusively in a shaft portion of the probe.

30. The method of claim 28, wherein the apparatus used for sensing is contained in a cartridge.

31. The method of claim 28, wherein the alignment flange is integral with the probe.

32. The method of claim 28, wherein the feature is at least one of a hole and a slot.

* * * * *